(12) United States Patent
Okubo (10) Patent No.: US 8,517,449 B2
(45) Date of Patent: Aug. 27, 2013

(54) MOTORCYCLE COWL STRUCTURE

(75) Inventor: Takefumi Okubo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 13/053,362

(22) Filed: Mar. 22, 2011

(65) Prior Publication Data

US 2011/0233956 A1 Sep. 29, 2011

(30) Foreign Application Priority Data

Mar. 25, 2010 (JP) ................................. 2010-070314

(51) Int. Cl.
*B62J 17/00* (2006.01)

(52) U.S. Cl.
USPC ........................................................ 296/78.1

(58) Field of Classification Search
USPC .............. 296/78.1, 192, 187.09, 203.02, 208, 296/70; 180/219, 227, 229, 311, 68.1, 274, 180/90; 454/146; 280/281.1, 728.2, 732; 303/137
See application file for complete search history.

(56) References Cited

U.S. PATENT DOCUMENTS

| | | | | |
|---|---|---|---|---|
| 2,555,146 A * | 5/1951 | McNamee, Sr. | ............ | 296/96.11 |
| 4,130,315 A * | 12/1978 | Shields | ......................... | 296/78.1 |
| 4,479,676 A * | 10/1984 | Hayes | ........................... | 296/78.1 |
| 4,515,405 A * | 5/1985 | Ogishima | ..................... | 296/78.1 |
| 4,564,081 A * | 1/1986 | Hamane et al. | ............... | 180/229 |
| 4,570,740 A * | 2/1986 | Hara | .............................. | 180/229 |
| 4,615,556 A * | 10/1986 | Stahel | .......................... | 296/78.1 |
| 4,650,204 A * | 3/1987 | Bothwell | .................... | 280/304.3 |
| 4,685,530 A * | 8/1987 | Hara | .............................. | 180/219 |
| 4,709,774 A * | 12/1987 | Saito et al. | ..................... | 180/229 |
| 4,776,422 A * | 10/1988 | Sakuma | ........................ | 180/219 |
| 4,830,135 A * | 5/1989 | Yamashita | ..................... | 180/229 |
| 4,887,688 A * | 12/1989 | Horiike et al. | ................ | 180/229 |
| 4,964,484 A * | 10/1990 | Buell | ............................ | 180/219 |
| 5,330,029 A * | 7/1994 | Yoshimura et al. | ........... | 180/219 |
| 7,370,902 B2 * | 5/2008 | Seki et al. | ..................... | 296/78.1 |
| 7,387,180 B2 * | 6/2008 | Konno et al. | ................ | 180/68.3 |
| 7,410,025 B2 * | 8/2008 | Sunaguchi et al. | ........... | 180/229 |

(Continued)

FOREIGN PATENT DOCUMENTS

| | | |
|---|---|---|
| DE | 3420352 A1 | 12/1985 |
| EP | 1 170 201 A2 | 1/2002 |
| EP | 1 514 782 A2 | 3/2005 |
| JP | 3-27028 Y2 | 6/1991 |

*Primary Examiner* — Kiran B Patel
(74) *Attorney, Agent, or Firm* — Birch, Stewart, Kolasch & Birch, LLP (57) ABSTRACT

A motorcycle cowl structure for suppressing a flow of air flowing toward a rider and a pillion passenger when the rider travels alone or when a pillion passenger is mounted on the same vehicle. A flow of air flowing toward a rider sitting on a rider seat and a pillion passenger sitting on a pillion passenger seat is suppressed by the cowl structure that includes left and right cowl main body portions for preventing the flow of air from hitting the knee portions, thighs, waist and flanks of the rider. Left and right movable cowl portions are provided on the respective left and right cowl main body portions so as to be movable vehicle-widthwise and opened to prevent flow of air from hitting the pillion passenger. The opening and closing of the movable cowl portions can suppress flow of air flowing toward the rider and the pillion passenger.

9 Claims, 7 Drawing Sheets

(56) References Cited

U.S. PATENT DOCUMENTS

| | | | |
|---|---|---|---|
| 7,850,221 B2* | 12/2010 | Nakata et al. | 296/78.1 |
| 8,047,597 B2* | 11/2011 | Nakamura | 296/78.1 |
| 2006/0087144 A1* | 4/2006 | Kamimura et al. | 296/78.1 |
| 2007/0267235 A1* | 11/2007 | Sudoh et al. | 180/68.3 |
| 2008/0289893 A1* | 11/2008 | Iwanaga | 180/229 |
| 2011/0156410 A1* | 6/2011 | Ogawa | 292/195 |
| 2011/0192668 A1* | 8/2011 | Kitta | 180/219 |
| 2013/0026784 A1* | 1/2013 | Maeda et al. | 296/181.1 |
| 2013/0075184 A1* | 3/2013 | Okubo et al. | 180/309 |

* cited by examiner

MOTORCYCLE COWL STRUCTURE

CROSS-REFERENCE TO RELATED APPLICATIONS

The present application claims priority under 35 USC 119 to Japanese Patent Application No. 2010-070314 filed on Mar. 25, 2010 the entire contents of which are hereby incorporated by reference.

BACKGROUND OF THE INVENTION

1. Field of the Invention

The present invention relates to an improvement in motorcycle cowl structure.

2. Description of Background Art

Some motorcycles are equipped with a cowling. This cowling is also called a cowl and has a role of enhancing the external appearance of a vehicle and suppressing the flow of air toward a rider. Japanese Utility Model Publication No. 3-27028 discloses cowl structures. See, for example, Japanese Utility Model Publication No. 3-27028, FIG. 2.

In this cowl structure illustrated in FIG. 2 of Japanese Utility Model Publication No. 3-27028, fixed flap portions (22) (the parenthetic numeral denotes a reference numeral described in Japanese Utility Model Publication No. 3-27028 and this applies to the following.) and a movable flap portion (23) are attached to a cowl main body (14) covering the front portion of a vehicle body.

The fixed flap portion (22) allows flow of air to flow on the side of a vehicle to prevent the flow of air from hitting a rider. When external temperature is high, the rider opens the movable flap portion (23) to introduce a flow of air from the gap of the opening movable flap portion (23), cooling her or his own leg.

The technology of Japanese Utility Model Publication No. 3-27028 can arbitrarily control air flowing toward the rider.

In addition, the motorcycle has a single-riding mode where a rider rides alone and a tandem-riding mode where also a pillion passenger (also called a passenger) rides in rear of the rider.

In view of restriction on the length of a motorcycle, pillion passengers frequently assume a mounting posture gripping the waist of a rider with her or his own knees. As viewed from the front of the vehicle, the knee caps, leg portions, waist and flanks of the pillion passenger are located on the vehicle-widthwise outside.

The movable flap portion (23) in Japanese Utility Model Publication No. 3-27028 is adapted to cover the rider but is not adapted to cover the knee cap, leg portion, waist and flank of the pillion passenger.

In other words, the conventional cowl structure does not take into consideration the needs of a windshield for a pillion passenger.

However, in the environment where the ban on the tandem riding on a motor expressway will be lifted, a cowl structure capable of suppressing the flow of air flowing toward a pillion passenger is desired.

SUMMARY AND OBJECTS OF THE INVENTION

It is an object of the an embodiment of the present invention to provide a motorcycle cowl structure that can suppress flow of air flowing toward a rider and a pillion passenger in a case where the rider travels alone or also a pillion passenger mounts the same motorcycle.

According to an embodiment of the of the present invention, a cowl structure for a motorcycle suppresses the flow of air flowing toward a rider sitting on a rider seat and a pillion passenger sitting on a pillion passenger seat, including: left and right cowl main body portions adapted to prevent a flow of air from hitting the knee portions, thighs, waist and flanks of the rider; and left and right movable cowl portions provided on the respective left and right cowl main body portions so as to be movable vehicle-widthwise and opened to prevent the flow of air from hitting the knee portions, thighs, waist and flanks of the pillion passenger.

According to an embodiment of the of the present invention, the left movable cowl portion is interlocked with the right movable cowl portion.

According to an embodiment of the of the present invention, the left and right movable cowl portions are mechanically coupled to each other by means of a link mechanism.

According to an embodiment of the of the present invention, the left and right movable cowl portions are mechanically interlinked with each other by means of a winding transmission mechanism.

According to an embodiment of the of the present invention, the left and right movable cowl portions are provided with respective left and right actuators and can be opened and closed in conjunction with each other or individually.

According to an embodiment of the of the present invention, the actuator is an electric motor or a cylinder unit.

According to an embodiment of the of the present invention, the actuator is a rack pinion mechanism or a worm wheel mechanism driven by the electric motor.

According to an embodiment of the of the present invention, the cowl structure includes the left and right cowl main body portions adapted to prevent a flow of air from hitting the knee portions, thighs, waist and flanks of the rider; and the left and right movable cowl portions provided on the respective left and right cowl main body portions so as to be movable vehicle-widthwise and opened to prevent a flow of air from hitting the knee portions, thighs, waist and flanks of the pillion passenger.

When riding on the motorcycle alone, the rider closes the movable cowl portions. The cowl main body portions can prevent a flow of air from hitting the knee portions, thighs, waist and flanks of the rider. However, the movable cowl portions are closed; therefore, there is no need to worry about an increase in travel resistance.

When the rider and the pillion passenger ride on the motorcycle, the movable cowl portions are opened. Therefore, the movable cowl portions prevent flow of air from hitting the knee portions, thighs, waist and flanks of the pillion passenger.

As described above, the present invention can suppress the flow of air flowing toward the rider and the pillion passenger in any case where the rider travels alone or also the pillion passenger mounts on the vehicle, the flow of air flowing toward the rider and the pillion passenger can be suppressed.

According to an embodiment of the of the present invention, the left movable cowl portion is interlocked with the right movable cowl portion. Since the left movable cowl portion is interlocked with the right movable cowl portion, there is no difference in operating characteristic between the left and right movable cowl portions. Therefore, a balance between the left and right of the vehicle can be kept satisfactory.

According to an embodiment of the of the present invention, the left and right movable cowl portions are mechanically interlinked with each other by means of the link mechanism.

Since the left and right movable cowl portions are mechanically interlinked with each other, their operation becomes more reliable. In addition, because of having a simple configuration, the link mechanism has a compact structure.

According to an embodiment of the of the present invention, the left and right movable cowl portions are mechanically interlinked with each other by means of the winding transmission mechanism.

Since the left and right movable cowl portions are mechanically interlinked with each other, their operation becomes more reliable. In addition, because of flexibility, the winding transmission mechanism provides a configuration having satisfactory anti-vibration performance.

According to an embodiment of the of the present invention, the left and right movable cowl portions are provided with respective left and right actuators and can be opened and closed in conjunction with each other or individually.

Since the left and right movable cowl portions are provided with the respective left and right actuators, the structure having a satisfactory left-right weight balance can be provided.

According to an embodiment of the of the present invention, the actuator is an electric motor or a cylinder unit.

Since the actuator is an electric motor or a cylinder unit, it can be fitted inside the cowl compactly, thereby downsizing the structure.

According to an embodiment of the of the present invention, the actuator is a rack pinion mechanism or a worm wheel mechanism driven by the electric motor.

Since the rack pinion mechanism or the worm wheel mechanism is interposed between the movable cowl portion and the electric motor, a reduction ratio can be provided and the electric motor can be reduced in size.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will hereinafter be described with reference to the accompanying drawings. It is to be noted that the drawings shall be viewed based on the direction of reference numerals. In addition, the front, back or rear, left and right denote directions a rider sitting on a seat looks.

A first embodiment of the present invention is first described with reference to the drawings.

Figure 1:
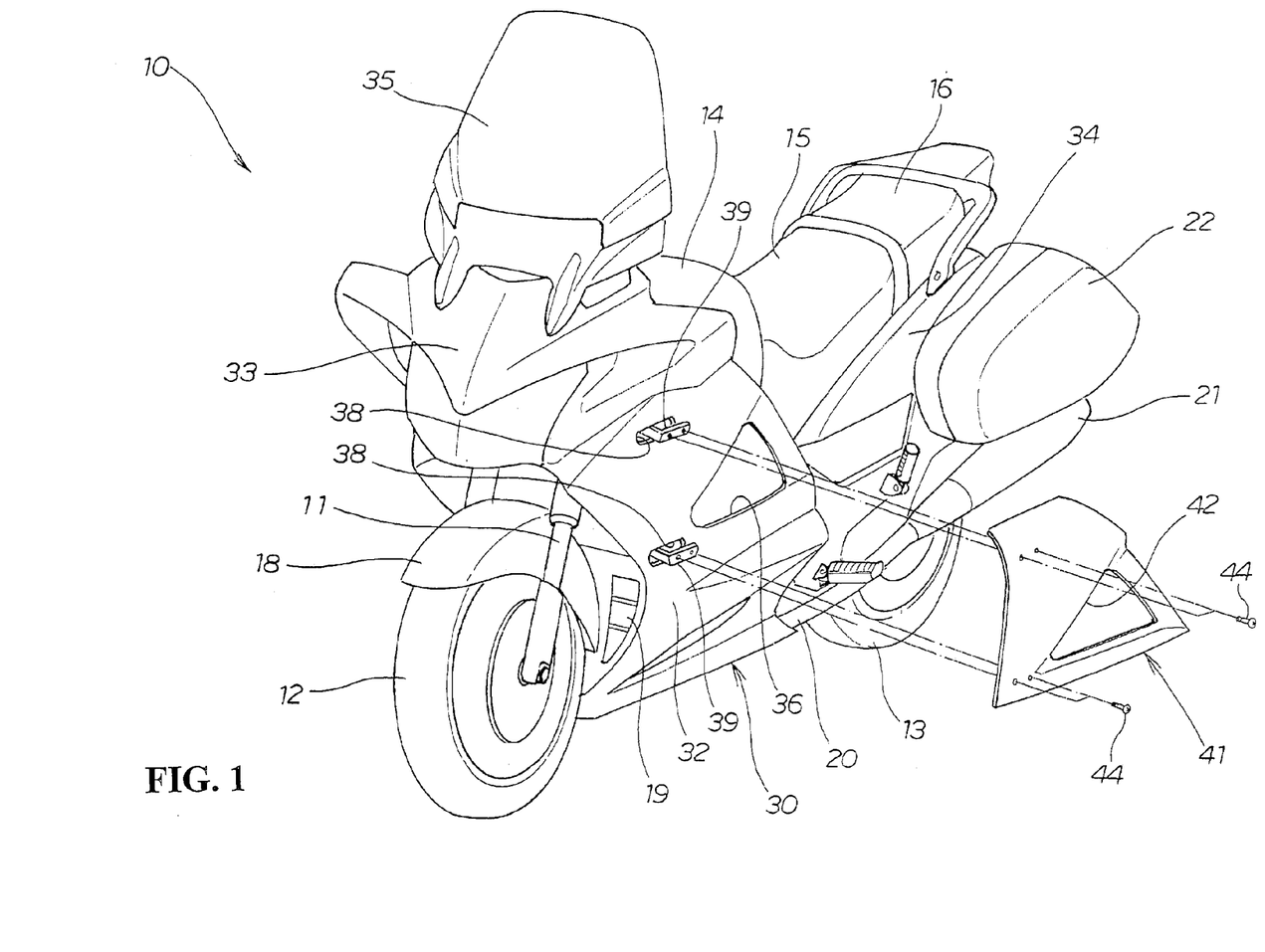
FIG. 1 is a perspective view of a motorcycle.

Referring to FIG. 1, a motorcycle 10 is a straddle-ride type vehicle on which a rider and a pillion passenger straddling a vehicle body.

The motorcycle 10 includes a front fork 11 at a front portion of the vehicle, a front wheel 12 rotatable at the lower portion of the front fork 11, and a rear wheel 13 at a rear lower portion of the vehicle. Further, the motorcycle 10 includes a fuel tank 14, a rider seat 15 on which the rider sits and the pillion passenger seat 16 on which a pillion passenger sits in this order from the upper center to rear of the vehicle.

A front fender 18 covering the front wheel 12 from above is mounted to the front fork 11 so as to prevent mud water from being splashed upward. A radiator 19 is disposed rearward of the front wheel 12.

An exhaust pipe 20 extending rearward is installed on the left lateral surface of the lower portion of the vehicle body. A muffler 21 is joined to the rear portion of the exhaust pipe 20. A saddlebag 22 is disposed above the muffler 21.

A cowl 30 is mounted to the vehicle body.

The cowl 30 includes left and right main body portions 32, a front cowl 33, and a rear cowl 34. The left and right main body portions 32 is adapted to prevent flow of air from hitting knee portions 31 in FIG. 4, thighs 75 in FIG. 4, waist 76 in FIG. 4 and flanks 77 in FIG. 4 of the rider. The front cowl 33 is disposed at a front upper portion of the cowl main body portion 32 to cover the front upper portion of the vehicle body. The rear cowl 34 is disposed below the rider seat 15 and the pillion passenger seat 16 to cover the rear upper portion of the vehicle body. A windscreen 35 is mounted on the upper portion of the front cowl 33.

The cowl main body portion 32 has a central portion shaped to bend in the vehicle-width direction and is provided with main body side openings 36 at its upper portion. The main body side opening 36 has a triangular shape tapered as it goes forward as viewed from the side of the vehicle body. The front ends of the left and right cowl main body portions 32 are opened to lead flow of air toward a radiator 19.

The cowl main body portion 32 is formed at a front portion with a plurality of (two, at upper and lower portions on one side in FIGS. 1 and 4) elongate holes 38. An arm 39 supported at its proximal end by the vehicle body projects from the elongate hole 38. The arm 39 is L-shaped so as to project vehicle-widthwise from the external surface of the cowl main body portion 32 and then bend rearward. The arm 39 can be shifted back and forth in the elongate hole 38.

Left and right movable cowl portions 41 are provided on the respective left and right cowl main body portions 32 so as to be movable vehicle-widthwise. The movable cowl portions 41 are each opened to prevent a flow of air from hitting the knee portions 40 in FIG. 5, thighs 78 in FIG. 5, waist 79 in FIG. 5 and flanks 80 in FIG. 5 of the pillion passenger.

The movable cowl portion 41 is shaped along the external surface of the cowl main body portion 32 and has a trapezoidal shape as viewed from the side of the vehicle. The upper edge and lower edge of the movable cowl portion 41 are formed to extend in the back and forth direction of the vehicle. The movable cowl portion 41 has a front edge formed to extend in a vertical direction and a rear edge tilted rearward downward as it goes toward the rearward of the vehicle.

The movable cowl portion 41 is provided with a movable side opening 42 having almost the same shape as that of the main body side opening 36. The movable side opening 42 is designed to conform with the main body side opening 36 in the state where the movable cowl portion 41 overlaps the cowl main body portion 32 (in the state where the movable cowl portion 41 is closed).

A front portion of the movable cowl portion 41 is fastened to the end portions of the upper and lower arms 39 by means of a plurality of (two in FIG. 2) bolts 44. The movable cowl portion 41 can be opened and closed by the anteroposterior swing of the end portion of the arm 39.

A cowl structure of the present invention is next described in detail with reference to FIG. 2.

Figure 2:
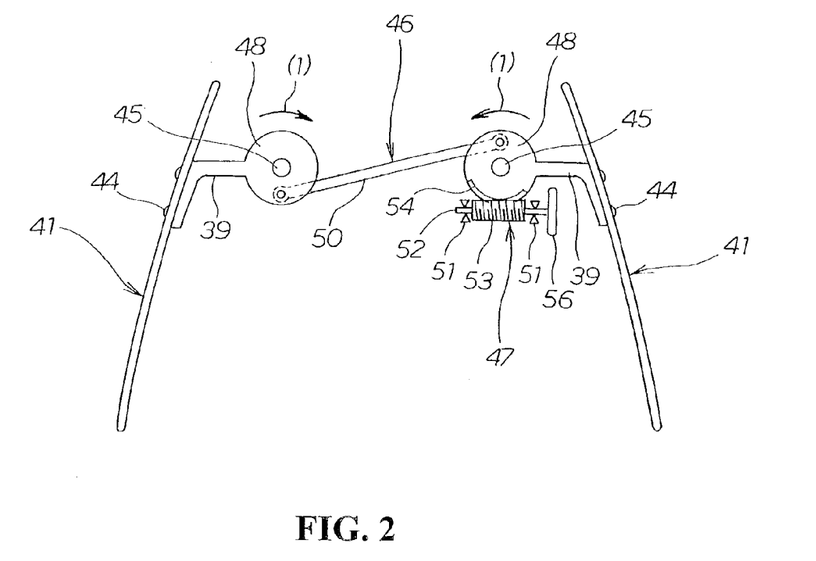
FIG. 2 is a plan view of an essential portion of a cowl structure according to a first embodiment.

As illustrated in FIG. 2, support shafts 45 are provided on the vehicle body. The arm 39 is turnably attached to each of the support shafts 45. The left and right movable cowl portions 41 are mechanically interlinked with each other by means of a link mechanism 46. The movable cowl portion 41 is driven by a worm wheel mechanism 47.

In addition, the support shaft 45 extends vertically (the axial direction of the support shaft 45). The support shaft 45 supports two, upper and lower, arms 39 in FIG. 1. FIG. 2 illustrates one of the upper and lower arms 39.

The link mechanism 46 includes swing portions 48 installed on the corresponding proximal portions of the arms 39 and a connecting bar 50 connecting the left and right swing portions 48 together.

The worm wheel mechanism 47 includes an operating shaft 52 supported by the right side of the vehicle body via bearings 51; a worm portion 53 provided on the operating shaft 52; and a wheel portion 54 installed on the right swing portion 48 and meshing with the worm portion 53. A handle 56 is attached to the operating shaft 52.

The operation of opening and closing the left and right movable cowl portion 41 is described with reference to FIGS. 2 and 3.

FIG. 2 illustrates the state where the left and right movable cowl portions 41 are closed.

A driver turns the handle 56 to turn the right swing portion 48 in the direction of arrow (1) via the worm portion 53 and the wheel portion 54. The turning of the right swing portion 48 turns also the left swing portion 48 via the connecting bar 50.

Figure 3:
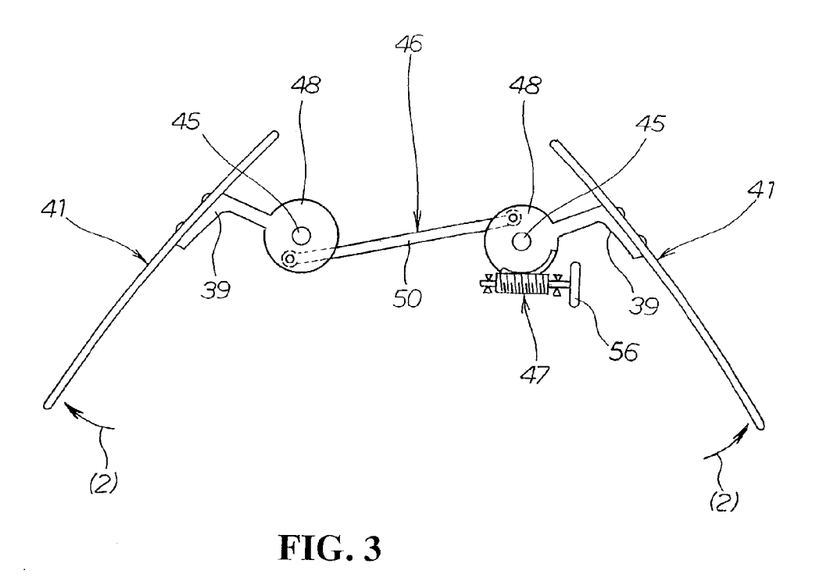
FIG. 3 is a view for assistance in explaining the operation of movable cowl portions.

As illustrated in FIG. 3, the turning of the left and right swing portions 48 open the left and right swing cowl portions 41 in the direction of arrow (2) via the corresponding left and right arms 39. In addition, the worm wheel mechanism may be installed on the left swing portion 48 and the right movable cowl portion 41 may be made to interlock with the left movable cowl portion 41.

A description is next given of the function and effect of the cowl structure of the motorcycle described above.

Figure 4:
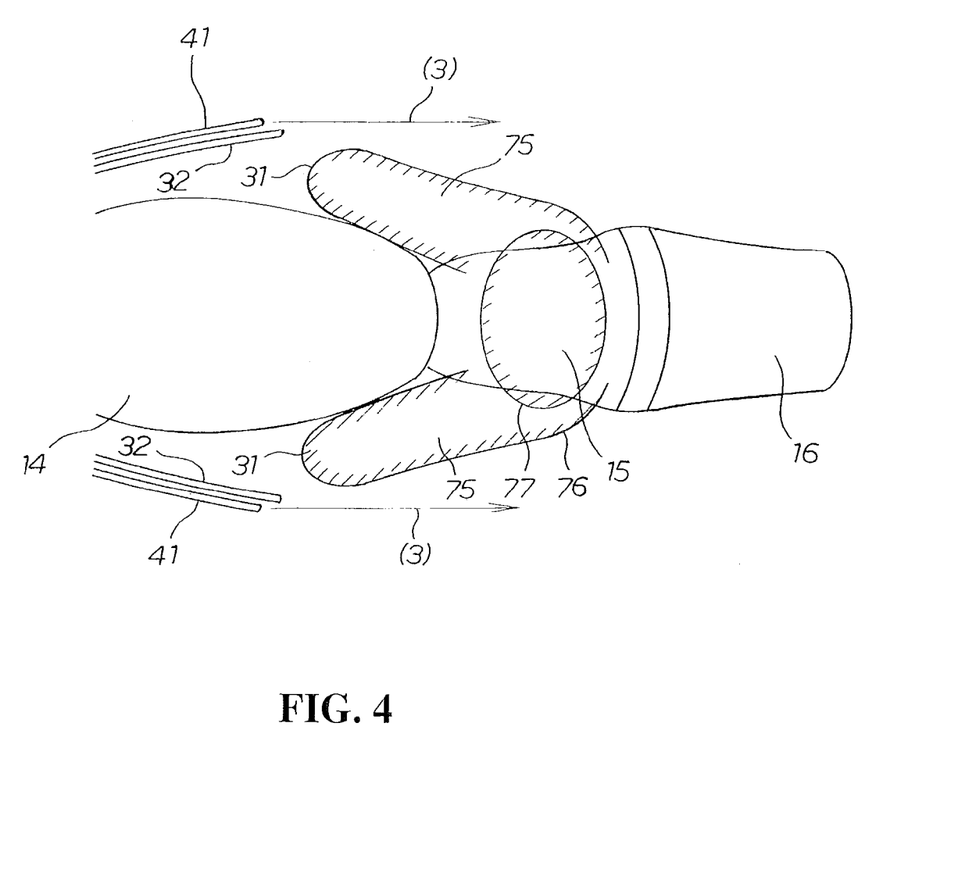
FIG. 4 is a view for assistance in explaining a windbreak function for a rider.
Figure 5:
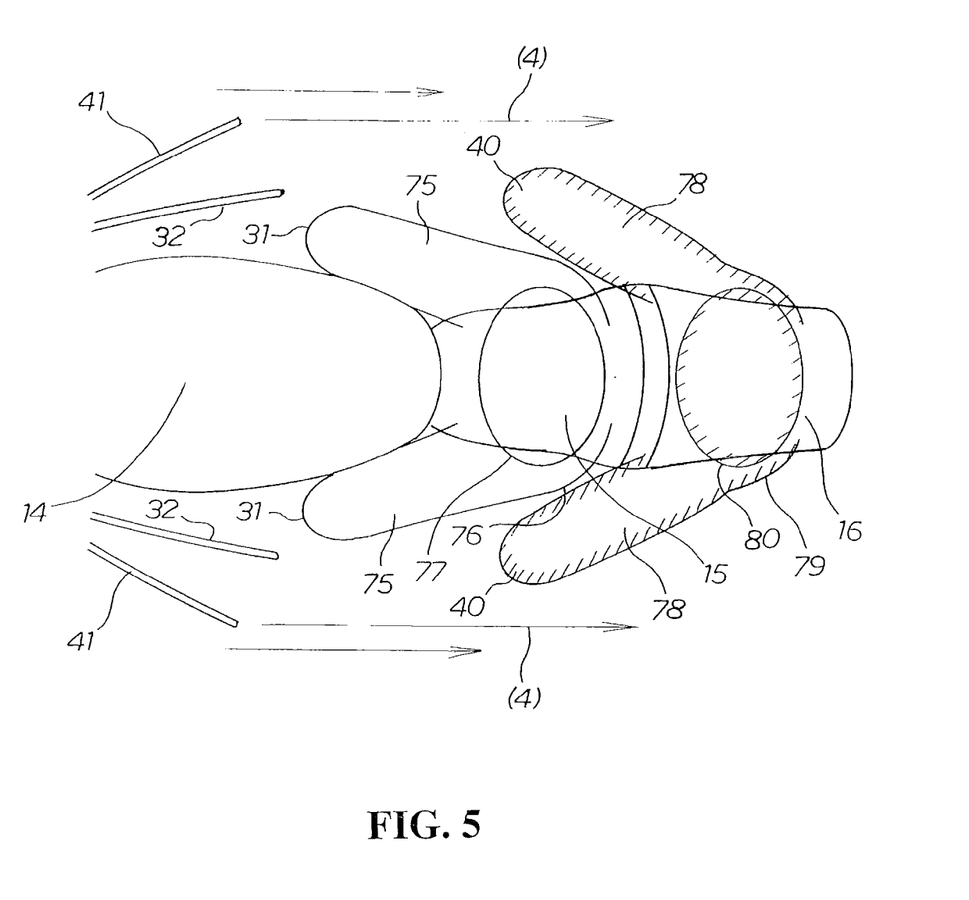
FIG. 5 is a view for assistance in explaining a windbreak function for a pillion passenger.

FIG. 4 illustrates a traveling vehicle on which a single rider is mounted as viewed from above. FIG. 5 illustrates a traveling vehicle on which the rider and a pillion passenger are mounted as viewed from above.

As illustrated in FIG. 4, if traveling alone, the rider adjusts the handle 56 in FIG. 2 to bring the left and right movable cowl portions 41 into the state of being closed toward the cowl main body portion 32. The cowl main body portions 32 allow a flow of air to flow on the external sides of the rider's knee portions 31 as illustrated with arrows (3), i.e., so as not to hit the knee portions 31, thighs 75, waist 76 and flanks 77 of the rider.

Since the left and right movable cowl portions 41 are closed, there is no concern that the left and right movable cowl portions 41 increase travel resistance.

As illustrated in FIG. 5, if also the pillion passenger rides on the vehicle, the handle 56 in FIG. 2 is adjusted to open the left and right movable cowl portions 41. The opened left and right movable cowl portions 41 allow a flow of air to flow on the external sides of the knee portions 40 of the pillion passenger as illustrated in arrows (4), i.e., so as not to hit the knee portion 40, thighs 78, waist 79 and flanks 80 of the pillion passenger.

Thus, in any case where the rider travels alone or also the pillion passenger is mounted on the vehicle, the flow of air flowing toward the rider and the pillion passenger can be suppressed.

In addition, since the left and right movable cowl portions 41 are mechanically interlinked with each other, their behavior becomes more reliable. Since the link mechanism has a simple configuration, its structure can be made compact.

A second embodiment of the present invention is next described with reference to the drawings.

Figure 6:
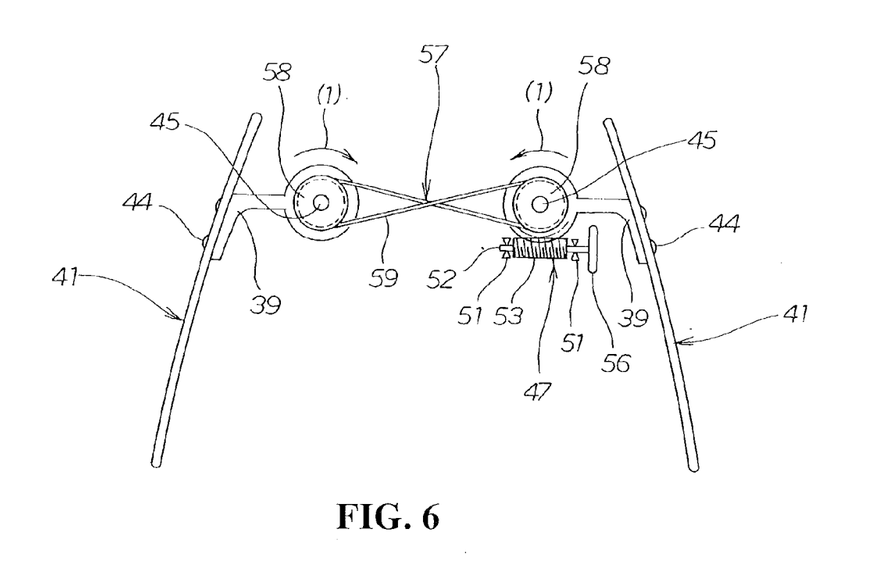
FIG. 6 is a plan view of an essential portion of a cowl structure according to a second embodiment.

FIG. 6 illustrates the second embodiment. In the basic configuration of the first embodiment in FIG. 2, the left and right arms 39 are mechanically interlinked with each other by means of a winding transmission mechanism 57. The other elements are the same as in FIG. 2. Therefore, a detailed description of reference numerals in FIG. 6 that are common with FIG. 2 is omitted.

The winding transmission mechanism 57 includes pulleys 58 provided on the left and right support shafts 45; and a cross-wound wire 59 wound around the left and right pulleys 59. In addition, it may be reasonable that a belt is used in place of the wire.

When the handle 56 is turned to turn the right pulley 58 in the direction of arrow (1), the turning force of the right pulley 58 is transmitted to the left pulley 58 via the cross-wound wire 59. In this way, the left movable cowl portion 41 is opened in conjunction with the right cowl portion 41.

Since the left and right movable cowl portions 41 are mechanically interlinked with each other, their behavior becomes more reliable. In addition, since the winding transmission mechanism 57 having flexibility is used, anti-vibration performance is enhanced.

A third embodiment of the present invention is next described with reference to the drawings.

Figure 7:
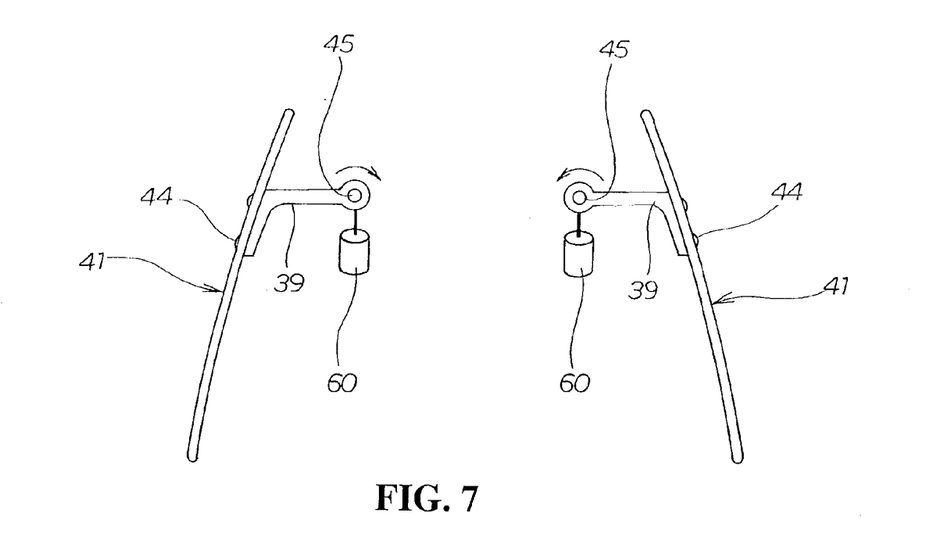
FIG. 7 is a plan view of an essential portion of a cowl structure according to a third embodiment.

FIG. 7 illustrates the third embodiment. In the basic configuration of the first embodiment in FIG. 2, an electric motor 60 is installed on each of left and right movable cowl portions 41 without the use of the link mechanism. The other elements are the same as in FIG. 2. Therefore, a detailed description of reference numerals in FIG. 7 that are common with FIG. 2 is omitted.

The electric motor 60 is connected to the proximal portion of the arm 39. The movable cowl portion 41 is opened and closed through the turning of the arm 39 by the electric motor 60.

The left and right movable cowl portions 41 are provided with the respective left and right electric motors 60; therefore, the structure is simpler than the structure provided with the interlink mechanism. Additionally, the structure having a left-right weight balance is provided.

In addition, in view of the left-right weight balance of the vehicle, the left and right electric motors 60 may electrically be controlled for interlinking.

A fourth embodiment of the present invention is next described with reference to the drawings.

Figure 8:
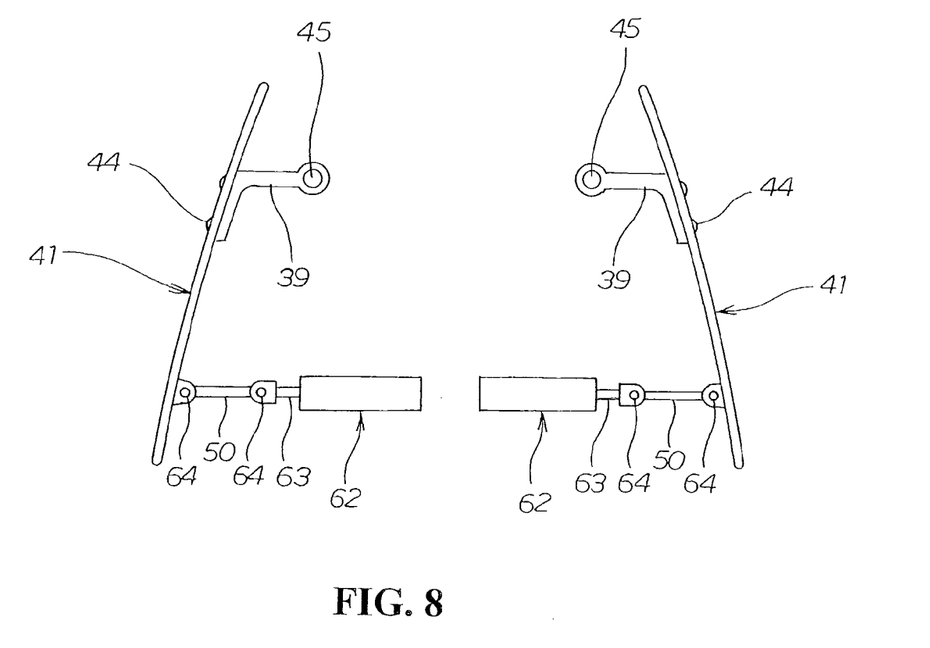
FIG. 8 is a plan view of an essential portion of a cowl structure according to a fourth embodiment.

FIG. 8 illustrates the fourth embodiment. In the basic configuration of the fourth embodiment in FIG. 8, the left and right movable cowl portions 41 are provided with respective cylinder units 62. The other elements are the same as in FIG. 2. Therefore, a detailed description of reference numerals in FIG. 8 that are common with FIG. 2 is omitted.

The hydraulic or pneumatic cylinder units 62 are provided right and left on the vehicle body. The cylinder units 62 are each installed such that its axial direction extends in the vehicle-width direction. A push rod 63 of each of the cylinder units 62 is connected to the rear portion of the movable cowl portion 41 via a connecting rod 50 and a connecting pin 64.

The push rod 63 is each reciprocated in the vehicle-width direction to open and close the movable cowl portion 41 around the support shaft 45.

Since the left and right movable cowl portions 41 are provided with the respective left and right cylinder units 62, the structure is simpler than that provided with the interlocking mechanism. In addition, the structure having a satisfactory left-right weight balance can be provided.

A fifth embodiment of the present invention is next described with reference to the drawings.

Figure 9:
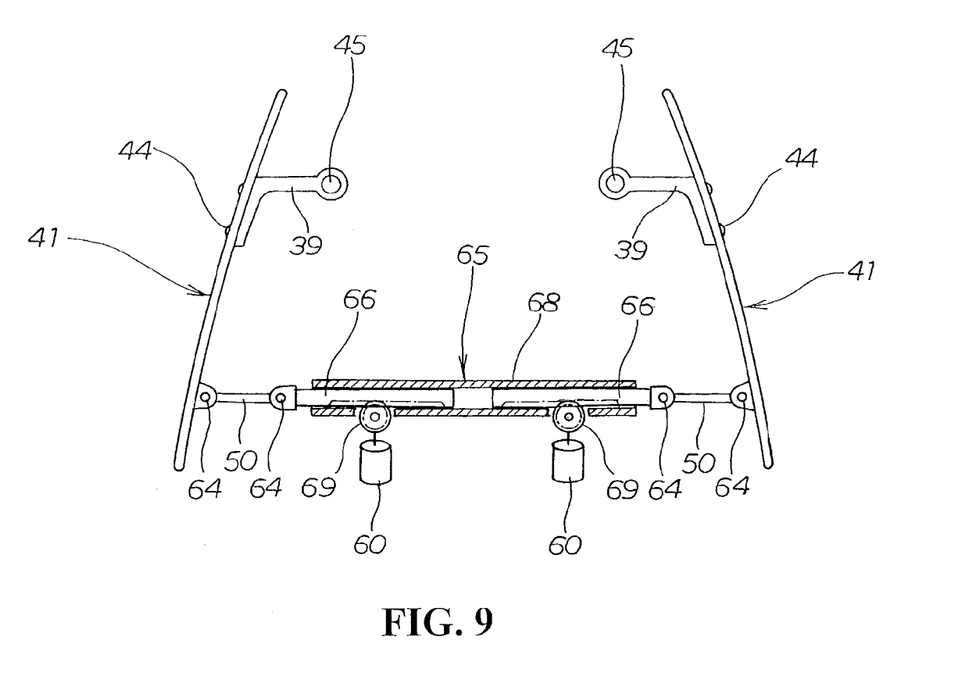
FIG. 9 is a plan view of an essential portion of a cowl structure according to a fifth embodiment.

FIG. 9 illustrates the fifth embodiment. In the basic configuration of the fifth embodiment in FIG. 9, a rack pinion mechanism 65 is installed in place of the cylinder units. The other elements are the same as in FIGS. 2 and 8. Therefore, a detailed description of reference numerals in FIG. 9 that are common with FIGS. 2 and 8 is omitted.

Left and right racks 66 are installed on the vehicle body. The racks 66 are housed in respective cases 68 so as to be reciprocatable vehicle-widthwise. The left and right racks 66 are each connected to the rear portion of the movable cowl portion 41 via a connecting rod 50 and a connecting pin 64 and to an electric motor 60 via a pinion 69.

The racks 66 are each shifted vehicle-widthwise by the electric motor 60 to open and close the movable cowl portion 41 around the support shaft 45.

Since the rack 66 and the pinion 69 are interposed between the movable cowl portion 41 and the electric motor 60, a reduction ratio can be provided and the electric motor 60 can be reduced in size.

A sixth embodiment of the present invention is next described with reference to the drawings.

Figure 10:
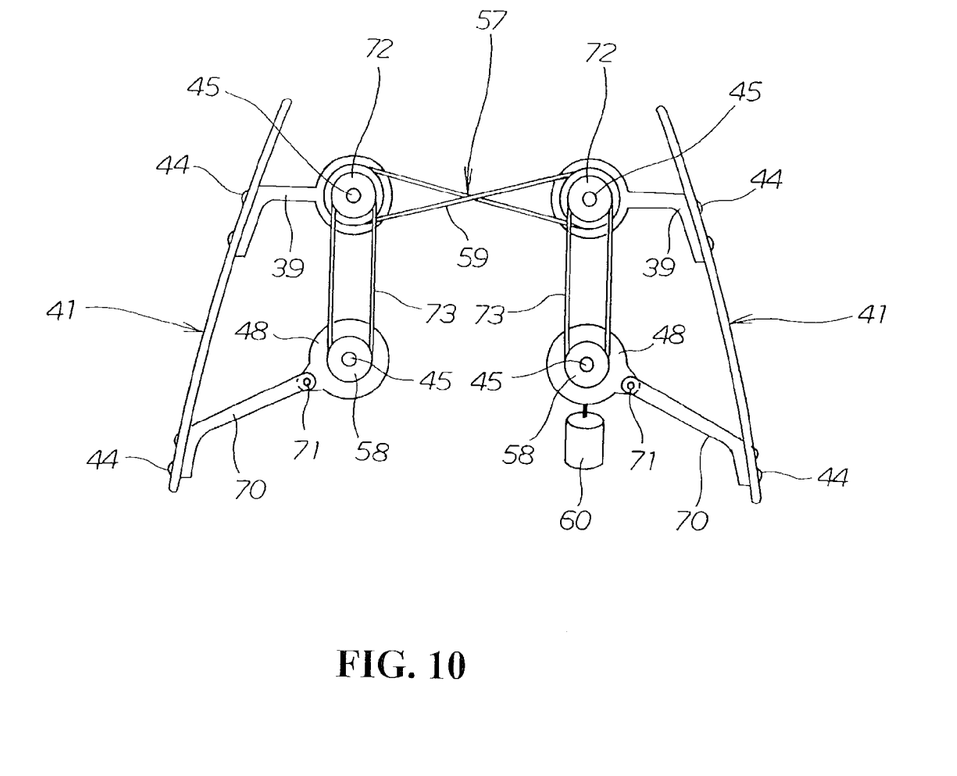
FIG. 10 is a plan view of an essential portion of a cowl structure according to a sixth embodiment.

Referring to FIG. 10, front, rear, left and right support shafts 45, four in total, are installed on a vehicle body. Arms 39 are supported by respective left and right support shafts 48 on the front side. On the other hand, rear arms 70 are supported by respective support shafts 45 on the rear side via corresponding swing portions 48 and pins 71. An electric motor 60 is connected to the right swing portion 48. The left and right arms 39 are connected to the left and right rear arms 70 by means of a winding transmission mechanism 57.

The winding transmission mechanism 57 includes pulleys 58 installed on the respective left and right support shafts 45 on the rear side; two-step pulleys 72 installed on the left and right support shafts 45 on the front side; parallel-wound wires 73 each wound around the pulley 58 and two-stage pulley 72; and the cross-wound wire 59 wound around the left and right two-stage pulleys 72.

The drive force of the electric motor 60 is transmitted to the left and right arms 39 and the left and right rear arms 70 by means of the winding transmission mechanism 57. The left and right arms 39 and the left and right rear arms 70 are turned around the corresponding support shafts 45 in conjunction with each other. The turning of the left and right arms 39 and left and right rear arms 70 opens and closes the left and right movable cowl portions 41.

Because of receiving the power through the four support members (the left and right arms 39 and the left and right rear arms 70), the movable cowl portions 41 can provide stable opening and closing operation.

In addition, the cowl structure of the motorcycle of the present invention is applied to the straddle-ride type motorcycle in the present embodiment. However, it is no problem that such a cowl structure is applied to a scooter-type motorcycle configured such that a pillion passenger mounts thereon in rear of a rider.

The cowl structure of the present invention is suitable for straddle-ride type vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cowl structure for a motorcycle for suppressing a flow of air flowing toward a rider sitting on a rider seat and a pillion passenger sitting on a pillion passenger seat, comprising:
   left and right cowl main body portions adapted to prevent the flow of air from hitting knee portions, thighs, a waist and flanks of the rider; and
   left and right movable cowl portions provided on the respective left and right cowl main body portions so as to be movable vehicle-widthwise and opened to prevent the flow of air from hitting knee portions, thighs, a waist and flanks of the pillion passenger; and
   a left arm having a distal portion secured to the left cowl and a proximal portion including a left swing portion and a right arm having a distal portion secured to the right cowl and a proximal portion including a right swing portion wherein the left and right swing portions are rotatably mounted for opening the left and right cowl main portions.

2. The cowl structure for a motorcycle according to claim 1, wherein the left movable cowl portion is interlocked with the right movable cowl portion.

3. The cowl structure for a motorcycle according to claim 2, wherein the left and right movable cowl portions are mechanically interlinked each other by means of a link mechanism.

4. The cowl structure for a motorcycle according to claim 2, wherein the left and right movable cowl portions are mechanically interlinked with each other by means of a winding transmission mechanism.

5. The cowl structure for a motorcycle according to claim 1, wherein the left and right movable cowl portions are provided with respective left and right actuators and can be opened and closed in conjunction with each other or individually.

6. The cowl structure for a motorcycle according to claim 5, wherein the actuator is an electric motor or a cylinder unit.

7. The cowl structure for a motorcycle according to claim 5, wherein the actuator is a rack pinion mechanism or a worm wheel mechanism driven by the electric motor.

8. The cowl structure for a motorcycle according to claim 1, further including a left support shaft operatively positioned relative to the left swing portion for rotatably mounting the left swing portion and a right support shaft operatively positioned relative to the right swing portion for rotatably mounting the right swing portion.

9. The cowl structure for a motorcycle according to claim 2, and further including a worm wheel mechanism operatively connected to at least one of the left and right cowl main body portions for selectively moving at least one of the left and right cowl main body portions and thereby imparting a movement to the other of the at least one right and left cowl main body portions.

\* \* \* \* \*